United States Patent
Dreher et al.

(10) Patent No.: US 9,004,164 B2
(45) Date of Patent: Apr. 14, 2015

(54) IN SITU RADIO FREQUENCY CATALYTIC UPGRADING

(75) Inventors: Wayne Reid Dreher, Houston, TX (US); Joe D. Allison, Bartlesville, OK (US); Lisa Jean Patton, Rockledge, FL (US); Victor Hernandez, Merritt Island, FL (US); Francis E. Parsche, Palm Bay, FL (US)

(73) Assignees: ConocoPhillips Company, Houston, TX (US); Harris Corporation, Melbourne, FL (US)

(*) Notice: Subject to any disclaimer, the term of this patent is extended or adjusted under 35 U.S.C. 154(b) by 518 days.

(21) Appl. No.: 13/455,959

(22) Filed: Apr. 25, 2012

(65) Prior Publication Data

US 2012/0267095 A1    Oct. 25, 2012

Related U.S. Application Data

(60) Provisional application No. 61/478,675, filed on Apr. 25, 2011.

(51) Int. Cl.

| | |
|---|---|
| *E21B 43/00* | (2006.01) |
| *E21B 43/24* | (2006.01) |
| *E21B 36/04* | (2006.01) |
| *C10G 31/06* | (2006.01) |
| *C10G 32/02* | (2006.01) |
| *C10G 49/00* | (2006.01) |
| *B01J 27/047* | (2006.01) |
| *B01J 27/051* | (2006.01) |
| *B01J 27/22* | (2006.01) |

(52) U.S. Cl.
CPC .......... *E21B 43/2401* (2013.01); *H05B 2214/03* (2013.01); *C10G 2300/1033* (2013.01); *C10G 2300/4037* (2013.01); *C10G 31/06* (2013.01); *C10G 32/02* (2013.01); *C10G 49/00* (2013.01); *B01J 27/047* (2013.01); *B01J 27/051* (2013.01); *B01J 27/0515* (2013.01); *B01J 27/22* (2013.01)

(58) Field of Classification Search
USPC .................. 166/248, 57, 302, 303, 272.1, 60
See application file for complete search history.

(56) References Cited

U.S. PATENT DOCUMENTS

| | | | |
|---|---|---|---|
| 4,251,808 | A | 2/1981 | Lichtblau |
| 6,455,825 | B1 | 9/2002 | Bentley et al. |
| 6,923,273 | B2 | 8/2005 | Terry et al. |
| 7,703,513 | B2 | 4/2010 | Vinegar et al. |
| 7,891,421 | B2 * | 2/2011 | Kasevich ............... 166/247 |
| 2004/0105980 | A1 | 6/2004 | Sudarshan et al. |
| 2005/0134520 | A1 | 6/2005 | Rawat et al. |
| 2009/0260824 | A1 * | 10/2009 | Burns et al. ............. 166/302 |
| 2010/0294489 | A1 | 11/2010 | Dreher, Jr. et al. |
| 2012/0061080 | A1 * | 3/2012 | Sultenfuss et al. ........ 166/302 |
| 2012/0067572 | A1 * | 3/2012 | Trautman et al. ........ 166/272.3 |
| 2012/0067580 | A1 * | 3/2012 | Parsche .................. 166/302 |

(Continued)

FOREIGN PATENT DOCUMENTS

| | | |
|---|---|---|
| WO | WO2010101826 | 9/2010 |
| WO | PCT/US12/35006 | 4/2012 |

*Primary Examiner* — Kenneth L Thompson
*Assistant Examiner* — Michael Wills, III
(74) *Attorney, Agent, or Firm* — Boulware & Valoir

(57) ABSTRACT

The present invention relates to a method and system for enhancing in situ upgrading of hydrocarbon by implementing an array of radio frequency antennas that can uniformly heat the hydrocarbons within a producer well pipe, so that the optimal temperatures for different hydroprocessing reactions can be achieved.

25 Claims, 9 Drawing Sheets

(56) References Cited

U.S. PATENT DOCUMENTS

| | | | |
|---|---|---|---|
| 2012/0073810 A1* | 3/2012 | Macadam et al. | 166/272.3 |
| 2012/0085533 A1* | 4/2012 | Madison et al. | 166/248 |
| 2012/0125607 A1* | 5/2012 | Parsche | 166/272.1 |
| 2012/0125608 A1* | 5/2012 | Parsche | 166/272.1 |

\* cited by examiner

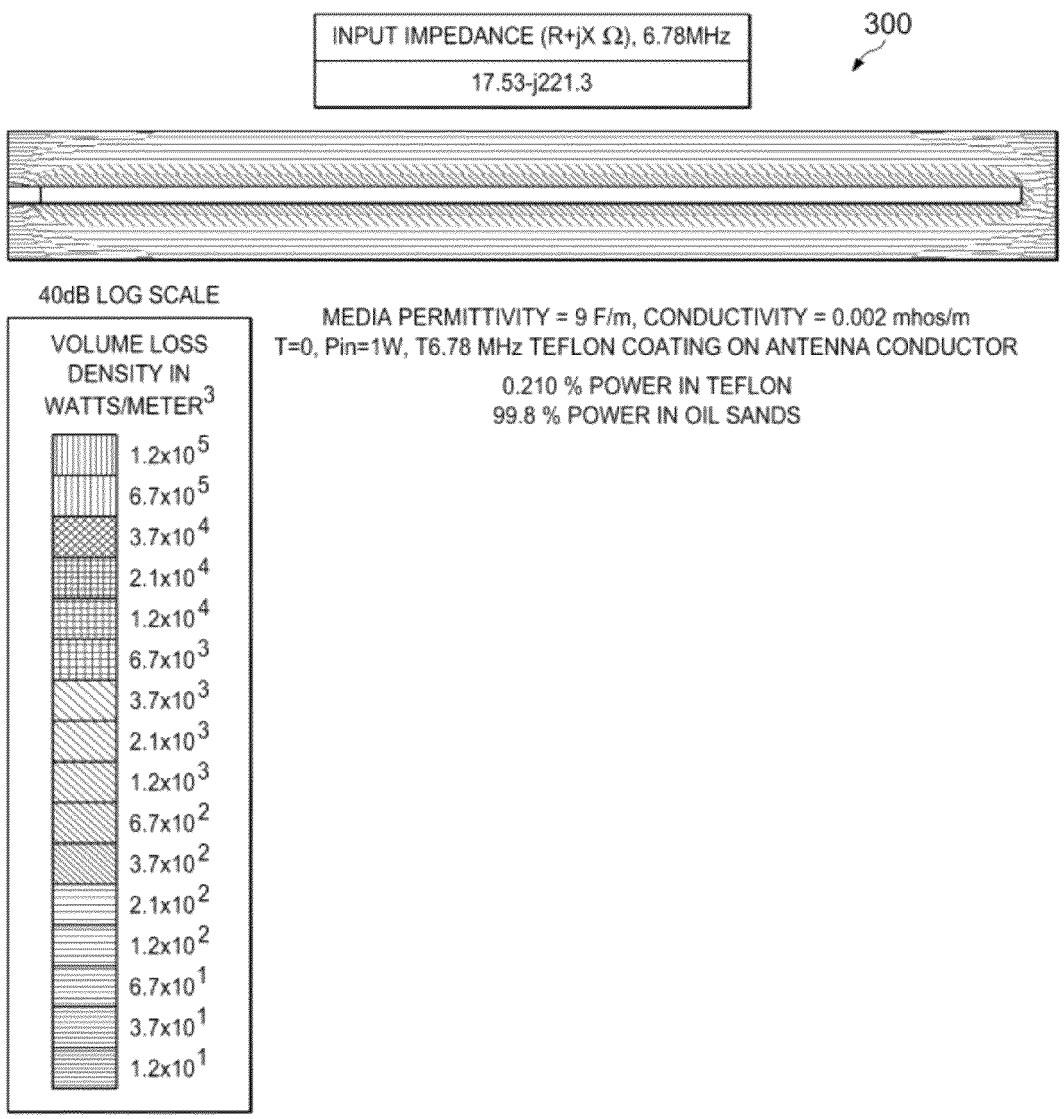

IN SITU RADIO FREQUENCY CATALYTIC UPGRADING

CROSS REFERENCE TO RELATED APPLICATIONS

The application claims priority to U.S. Ser. No. 61/478,675, filed Apr. 25, 2011, and expressly incorporated by reference herein in its entirety for all purposes.

FEDERALLY SPONSORED RESEARCH STATEMENT

Not applicable.

REFERENCE TO MICROFICHE APPENDIX

Not applicable.

FIELD OF THE INVENTION

The invention relates to a method and system for enhancing in situ upgrading of hydrocarbons by radio frequency heating and catalytic treatment.

BACKGROUND OF THE INVENTION

Oil sands are a type of unconventional petroleum deposit. The sands contain naturally occurring mixtures of sand, clay, water, and a dense and extremely viscous form of petroleum technically referred to as "bitumen," but may also be called heavy oil or tar. Many countries in the world have large deposits of oil sands, including the United States, Russia, and various countries in the Middle East. However, the world's largest deposits occur in Canada and Venezuela.

The crude bitumen contained in the Canadian oil sands is described as existing in the semi-solid or solid phase in natural deposits. Bitumen is a thick, sticky form of crude oil, so heavy and viscous (thick) that it will not flow unless heated or diluted with lighter hydrocarbons. At room temperature, it is much like cold molasses. Due to its high viscosity, these heavy oils are hard to mobilize, and they generally must be made to flow in order to produce and transport them.

Steam assisted gravity drainage (SAGD) is a commercial recovery process used for recovering heavy oil and bitumen that possess low to no mobility under native reservoir conditions. For SAGD, steam is circulated within horizontal injection and production wells that are spaced vertically 5 meters apart and placed near the base of the reservoir. Once fluid communication is established between the wells, the top well is operated as a dedicated injector well, and the bottom well is a producer well. With time, the steam melts the bitumen directly above the injector well and the resulting fluid is produced via gravity drainage to the base of the reservoir. Once steam reaches the top of the reservoir, the steam spreads horizontally within the reservoir, creating a steam chamber. As steam continues to be injected, the latent heat of vaporization of water drives the ability to melt and subsequently drain fluids for production. In the SAGD process, the produced fluid consists of an oil and water emulsion that can contain as much as 70% (w/w) water.

The rate at which fluid is produced by the reservoir is driven by both gravity drainage and the subcool, which is the temperature difference between the injector and producer wells. The added impact of subcool on production allows for the avoidance of the production of live steam, which can have significantly adverse effects on production facilities.

The temperature of produced fluids within a SAGD operation are lower than injected steam, but can still be in excess of 200° C. Although this is sufficient for maintaining the mobility of produced fluids, it is generally not sufficiently high enough to initiate chemical upgrading reactions within the reservoir. However, the controlled production of fluids within a SAGD operation does lend it to being combined with other processes that can produce sufficiently high temperatures to enable upgrading reactions.

FIG. 1 illustrates the rate at which water progresses through a developing steam chamber during normal SAGD operations. As shown, the velocity rate for water is between 0.2 and 0.5 m/day. As the steam chamber grows horizontally with time, this rate can be expected to decrease based on a decrease in the gravity drive for producing fluids. With this in mind, water may take anywhere from 50 to 125 days to vacate the reservoir. Chemical reactions require sufficient temperature and time of mixing to occur for the energy of activation of the reaction to be overcome. Although SAGD does not offer sufficient temperature as a standalone process, it is clear that the slow rate of the process can allow for sufficient mixing under proper conditions.

This ability to control the rate at which oil is drained from the reservoir allows for the opportunity to initiate chemical reactions that will allow for the hydrocarbon to be upgraded prior to producing the fluid from the reservoir. This will lead to a decrease or complete removal for the need of adding solvent at the surface for thinning the heavy oil and allowing transport to refineries. In addition, the oil will be more suitable for standard refinery configurations.

In situ upgrading has been attempted by using a solvent process known as VAPEX. In this approach, a solvent mobilizes the oil by decreasing its viscosity through a dissolution effect. During this process, asphaltenes, heteroatoms and heavy metals may precipitate, resulting in upgraded oil. Solvent to oil ratios are high, however, which makes this process economically unfeasible. In addition, as larger molecules precipitate, flocculation may occur, which may lead to the clogging of the producing well. Further, solvent usage contributes to negative ecological impact.

Alternative enhanced oil recovery mechanisms include Electro-Thermal Dynamic Stripping Process (ET-DSP) and In Situ Combustion (ISC). ET-DSP is a patented process that uses electricity to heat oil sands deposits to mobilize bitumen, allowing production using simple vertical wells. ISC uses oxygen to generate heat (fire) that diminishes oil viscosity; alongside carbon dioxide generated by heavy crude oil to displace the oil toward the production wells.

One ISC approach is called "THAI" for Toe to Heel Air Injection. This is an experimental method that combines a vertical air injection well with a horizontal production well. The process ignites oil in the reservoir and creates a vertical wall of fire moving from the "toe" of the horizontal well toward the "heel", which burns the heavier oil components and upgrades some of the heavy bitumen into lighter oil right in the formation. Advocates of this method of extraction state that it uses less freshwater, produces 50% less greenhouse gases, and has a smaller footprint than other production techniques. Historically, however, there has been difficulty controlling the flame front and a propensity to set the producing wells on fire.

"CAPRI" is the variant of the THAI process that adds an annular sheath of solid catalyst surrounding the horizontal producer well. Thermally cracked oil produced by THAI passes through the layer of catalyst en-route to the horizontal producer well. Laboratory tests indicate that the combination of THAI and CAPRI can achieve significant upgrading. However, it is not clear that CAPRI can upgrade heavy oil to the point where it can be transported by pipeline without diluent. Thus, although a very promising technology, there is still room for improvement.

Thus, what is needed in the art are ecologically attractive methods of in situ upgrading of heavy oil that require less expenditure of energy, and yet still produce oil sufficiently light as to be transportable by pipeline.

SUMMARY OF THE INVENTION

The present invention provides a novel method and system for enhancing the in situ upgrading of hydrocarbons, especially hydrocarbons such as heavy oil or bitumen. In addition to the conventional catalyst bed provided in the producer well pipe that assists in situ hydroprocessing, the present invention provides an array of RF antennas in the producer well pipe to locally heat the hydrocarbons up to a temperature range suitable for hydroprocessing. Contrast to conventional SAGD that typically slowly heats the reservoir to approximately 260° C., the RF antennas can provide nearly instantaneous penetration of the heating energy and can heat to the boiling point of water at reservoir conditions. By spacing the array of antennas along the centerline of the well pipe, a uniform heating can be achieved, and with the aid of catalysts the in situ hydroprocessing can be further facilitated.

According to an aspect of the present invention, there is provided a method of enhancing the in situ upgrading hydrocarbons in a producer well in a hydrocarbon reservoir, comprising: providing a producer well pipe having a catalyst in contact with the hydrocarbons to be produced; providing a radio frequency (RF) heating mechanism near the producer well, preferably inside or along a centerline of the producer well. The RF then heats the hydrocarbon to be produced in the producer well, allowing upgrading reactions to occur, and producing the upgraded hydrocarbon.

The catalyst is not limited in its form, but a packed bed catalyst lining may be preferable in the present invention. A loosely filled packed bed may also be useable if the packing does not overly inhibit flow, and other formats such as baffles, plates, trays, and other structured packing formats are also possible.

For in situ upgrading purposes, the catalyst preferably comprises hydroprocessing catalysts, including but not limited to, metal sulfides, metal carbides, refractory type metal compounds, or the combination thereof. For example, the metal sulfides may be $MoS_2$, $WS_2$, CoMoS, NiMoS or combinations thereof. The metal carbides may be MoC, WC, or combinations thereof. The refractory type metal compounds may include metal phosphides, metal borides or combinations thereof.

The way the RF antennas are arranged is not limited, as long as the heating can be modulated and the desirable heating results can be achieved. In one embodiment the RF antennas are linear antennas (i.e. having linear electrical conductors) and are arranged in series, with electrical feeds at regular intervals along the centerlines of the producer well pipe. It should be noted that other forms of antennas and other arrangements are also possible, and a skilled artisan should be able to perceive other implementations without deviating from the spirit of the present invention.

The conductive wires feeding to the antenna are preferably encased in a conductive tube so as to prevent unwanted heating of the formation. For example, a shielded transmission line is realized to feed the antennas in series, otherwise the electrical current in unshielded wires cannot reach to the end of the pipe.

According to another aspect of the present invention, there is provided a system for enhancing the in situ upgrading of a hydrocarbon in a producer well in a hydrocarbon reservoir, comprising: a producer well pipe located within the hydrocarbon reservoir, the producer well pipe having a centerline and a catalyst lining in contact with hydrocarbon to be produced; a plurality of radio frequency (RF) antennas located along the centerline of the producer well pipe; and a radio frequency current source connected to the plurality of RF antennas through conductive wires; wherein each of the plurality of antennas are spaced apart from each other; wherein RF heats the bitumen, thus mobilizing it, and the catalysts simultaneously or nearly simultaneously upgrade it.

In one embodiment, the producer well pipe further comprises a magnetic field heating susceptor to enhance the heating effect. Susceptor particles are powdered metal, powdered metal oxide, powdered graphite, nickel zinc ferrite, butyl rubber, barium titanate powder, aluminum oxide powder, or PVC flour, and optionally the susceptor particles can include an insulative coating. See e.g., WO2010101826. Preferably, the magnetic field heating susceptor can be comprised of pentacarbonyl iron powder with phosphate ($FeSO_4$) coating.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," and "include" (and their variants) are open-ended linking verbs and allow the addition of other elements when used in a claim. The phrase "consisting of" excludes other elements. The term "consisting essentially of" occupies a middle ground, allowing the inclusion of nonmaterial elements, such as buffers, salts, proppants, and the like, that do not materially change the novel features or combination of the invention.

The following abbreviations are used herein:

| | |
|---|---|
| ET-DSP | Electro-thermal dynamic stripping process |
| ISC | In situ combustion |
| RF | Radio frequency |
| SAGD | Steam assisted gravity drainage |
| THAI | Toe to Heel Air Injection |

As used herein "upgrading" refers to chemical and/or physical reactions that break down the hydrocarbon into molecules of lower carbon number or remove impurities from the crude oil.

The term "hydroprocessing" may include hydrotreating, hydrocracking desulfurization, olefin and aromatic saturation/reduction, or similar reactions that involve the use of hydrogen. Through hydroprocessing the viscosity of the crude oil may be reduced, thus more readily produced and transported. Through the removal of impurities the quality of the crude oil can be improved, thus facilitating subsequent processing and saving operational costs.

The term "centerline" means inside a pipe, at or near the center of the pipe. A wire may deviate from exact center since a wire may be quite flexible, although a centerline location is preferred.

Intended to include use of existing equipment, as well as the provision of new equipment. Thus, providing a producing well, can include using an existing well.

BRIEF DESCRIPTION OF THE DRAWINGS

FIG. 3 shows the simulation result of the antenna heating pattern.

DESCRIPTION OF EMBODIMENTS OF THE INVENTION

The following examples are intended to be illustrative only, and not unduly limit the scope of the appended claims. RF heating can provide an early instantaneous penetration of heating energy to initiate steam convection to speed resource recovery, and when coupled with in situ catalytic upgrading, can significantly improve cost effectiveness of production.

When considering options for chemically upgrading the oil in the reservoir, SAGD will serve as the mechanism to mobilize and produce the oil. However, additional technologies must be incorporated into the overall process for upgrading to occur. For example, the use of a catalyst and/or catalyst system will be required. Options for introducing catalyst into the reservoir include pack bed catalysts that line the inside of the producer well or ones that may be injected into the reservoir by slurry or emulsion.

Specific catalysts that facilitate upgrading for this process will ideally be less susceptible to poisoning by sulfur species, water oxidation, nitrogen or heavy metal poisoning or other forms of potential transition metal catalyst poisoning. Some examples of possible hydroprocessing catalysts that may be applicable are metal sulfides ($MoS_2$, $WS_2$, CoMoS, NiMoS, etc), metal carbides (MoC, WC, etc.) or other refractory type metal compounds such as metal phosphides, borides, etc. It is not anticipated that reduced metal catalysts will remain active for a long period of time in this application, in such cases, catalyst regeneration techniques will be required.

Hydroprocessing reactions of the type expected (desulfurization, olefin and aromatic saturation, hydrocracking) can occur between hydrogen pressures of 50 psi to several thousand psi $H_2$. It is anticipated to provide $H_2$ at as high partial pressure as feasible. This can be from between 50 and 1200 psi $H_2$ and preferably between 600 to 800 psi $H_2$. The ultimate hydrogen pressure in practice will be determined via experimental testing. The space velocity of the hydrocarbon in the catalyst/hydrogen zone should be between 0.05 to 1.0 $hr^{-1}$ or more preferably between 0.2 and 0.5 $hr^{-1}$.

Typical hydroprocessing types of reactions will consist of impurity removal processes, such as the removal of sulfur, nitrogen and metals. This can improve the ultimate quality of the crude. Hydrogen assisted removal of oxygen can lower the acid number of the crude. Reduction of aromatics will produce "lighter" hydrocarbons thus lowering the API gravity of the crudes. Potential hydrocracking/isomerization reactions can provide lower carbon number branched hydrocarbons and will improve a lower viscosity crude. It is expected that some combination of all the above reactions will be realized, thus giving an improved quality and less viscous crude.

Figure 1:
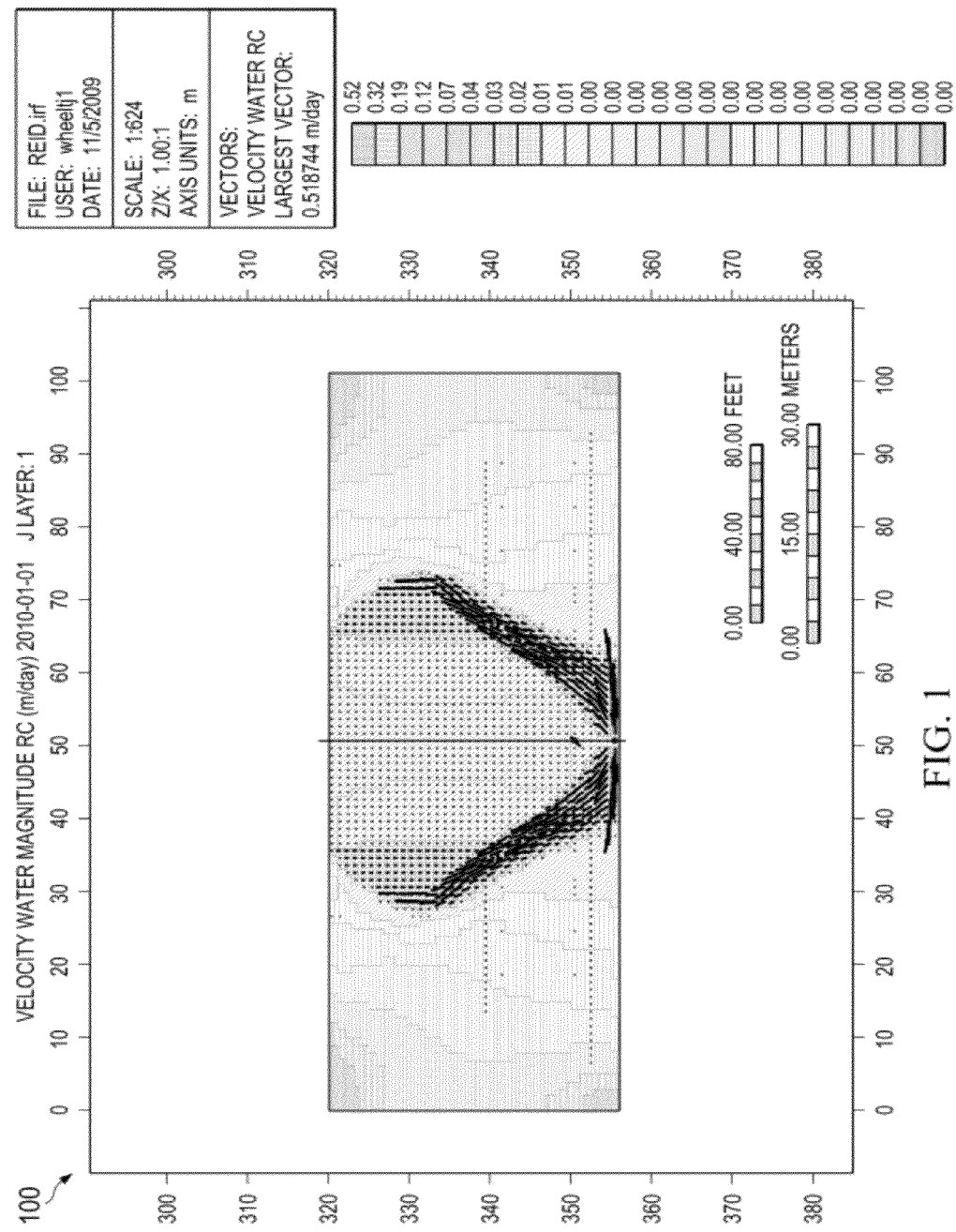
FIG. 1 is a velocity profile of water within a developing SAGD steam chamber.
Figure 2:
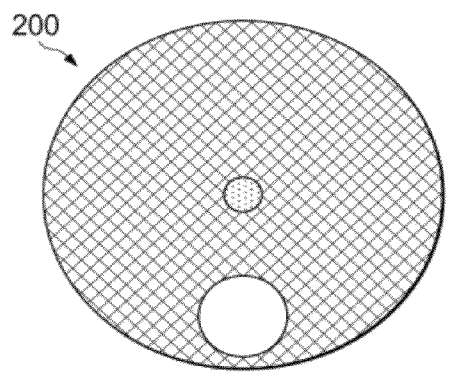
FIG. 2 shows a cross-sectional view of a subsurface producer/reactor.

Hydrogen may be introduced into the reservoir by several mechanisms. One approach is to directly inject hydrogen into the reservoir from surface facilities using straight or coiled tubing. An example for how this may be realized within a subsurface producer/reactor is shown in FIG. 2, which shows a system 200 having outer pipe containing catalyst, which is fed by an inner line feeding hydrogen and the producer line from which upgraded oil is collected.

Additional options for introducing hydrogen into the reservoir for supporting upgrading reactions is by in situ gasification of residual oil remaining in the steam chamber or by chemically modifying the original oil in place to liberate hydrogen.

As stated above, for upgrading to occur, there is a requirement for all necessary components for the reaction to sufficiently mix for the required period of time. An issue with using only SAGD for this process is the temperature/pressure limitation for steam. Under standard reservoir conditions, the temperature of steam in a SAGD process is approximately 260° C. To address this issue, an RF antenna will be installed in order to successfully optimize the conditions of the pipe and to also heat heavy oils at the surface near the well bore.

To achieve catalytic upgrading of bitumen and heavy oils subsurface, placement of the catalyst, heat and hydrogen are important. For example, in addition to the catalyst, a heat source must be utilized for proper conversion of the oil, and hydrogen is generally required. This invention is aimed at utilization of a reaction zone as designated at or near the producer well where catalyst, hydrogen, and heated oil will mix for a time sufficient to facilitate upgrading.

The proposed antenna design will have multiple linear electrical conductors to form an antenna array around a producer well packed or lined with a catalyst material. Also, the design should have an electrical current that is reapplied and retracted at regular interval along the linear conductor inside the pipe, which will allow for a constant heating throughout the pipe interior. A representation of the delivered heat pattern in watts/cubic meter using the array is shown in FIG. 3.

FIG. 3 shows a simulation using specified values of permittivity and conductivity, wherein the axial heating gradient is uniform because of the array technique, which repeats the electrical current injection. The realized temperatures (T) are a function of the duration of the heating (t) in minutes, the applied power (P) in watts, the density ($\rho$) of the heated hydrocarbons in kilograms/cubic meter, the weight of the hydrocarbons (w) heated in kilograms and the specific heat $c_p$ of the hydrocarbons in watts/kilograms. Thus, the present invention may suffice for most if not all combinations of realized temperatures and heating rates.

A particular advantage of the radio frequency electromagnetic heating is its speed. Hydrocarbons are characterized by relatively low thermal conductivities, so conducted heating is slow and convection may not be an option in the catalyst bed.

The electromagnetic energies, however, penetrate the material to be heated nearly instantaneously to provide virtually any heating rate desired.

Figure 4:
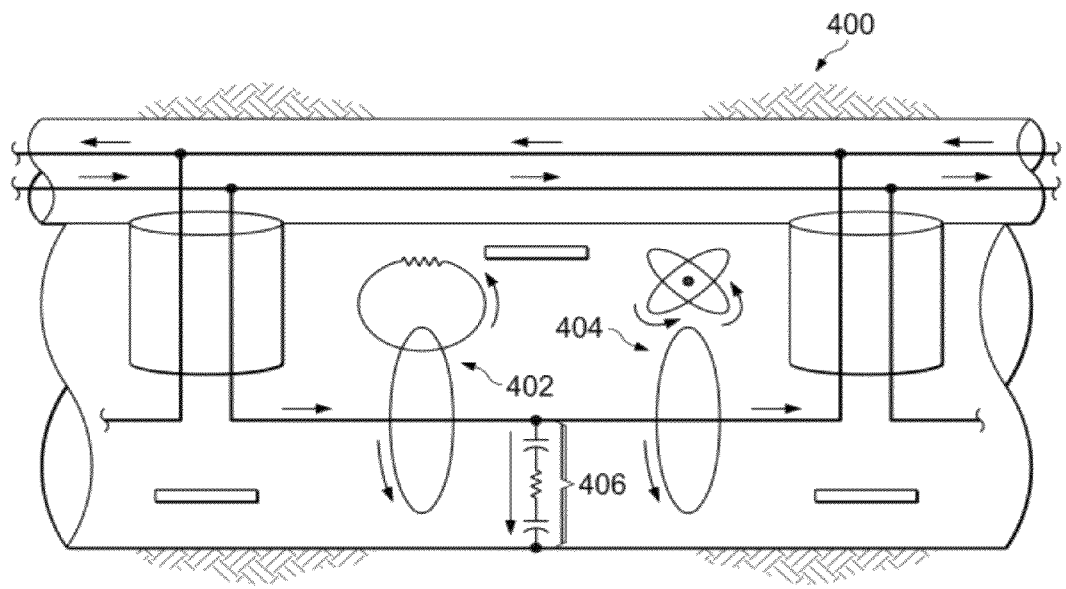
FIG. 4 is a schematic view showing the electrical concept of the RF heating operation.

Under certain conditions, in order to stimulate production an RF-only heated well may apply heating energy at a rate of 2 to 10 kilowatts per meter of well length. The electrical concept of operation is described in FIG. 4. In FIG. 4, the circular magnetic near fields 404 heat the ferromagnetic susceptor atoms by magnetic moment/hysteresis, and the circular magnetic near field 402 from the linear antenna conductor causes eddy electric currents to flow in the catalyst-susceptor matrix, such that the heating by joule effect can be accomplished. The radial electric near fields displace electric currents by entering into the catalyst-susceptor matrix, which heats resistively by joule effect. In other words, the RF heating occurs in the pipe filled with catalyst-susceptor matrix by flux coupling to the magnetic moment of the iron atoms in the pentacarbonyl iron powder. It is to be noted that resistive heating by electrode contact is not shown in FIG. 4, because it is not a preferred method in the present embodiment, as it can be unreliable due to hydrocarbon films that the live oil can form on the antenna surface. Such films may significantly reduce the efficiency of resistive heating.

Figure 5:
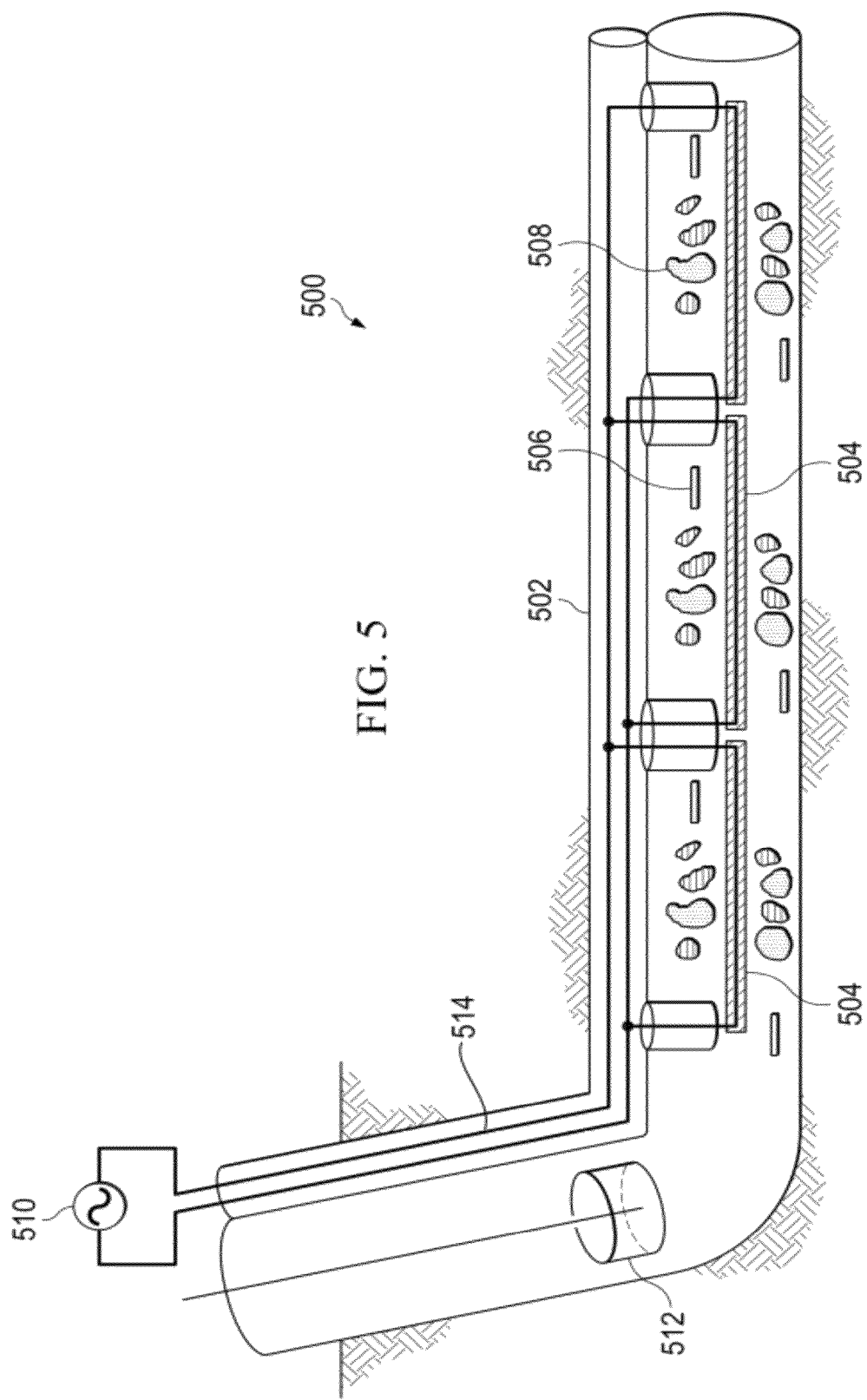
FIG. 5 is a detailed illustration of the overall antenna operational design of the present invention.

With respect to FIG. 5, a RF heating apparatus 500 is shown, wherein the antenna operates by using an RF electrical current source 510 that will include provisions for constant impedance matching, positioned along the outside upper portion of the producer well. The RF electromagnetic heating is provided by linear electrical conductors 504, located throughout the pipe located along the centerline, and electrical connections on either end forming the closed electrical circuit. The conductive wires 514 next to the producer well are encased in a conductive tube 502 to prevent them from heating the formation. If these wires were unshielded, the electrical current would not make it to the end of the pipe. Each element of the antenna (electrical conductor and electrical connections) is fed in parallel for reliability and maintainability. The producer well filled with catalyst may incorporate a magnetic field heating susceptor 508 comprised of pentacarbonyl iron powder with phosphate coating ($FePO_4$). Also, depicted in this drawing is the typical oil equipment such as the pump 512, to retrieve the oil, as well as the slits 506 in the well, to allow oil to pass through into the well.

Figure 6:
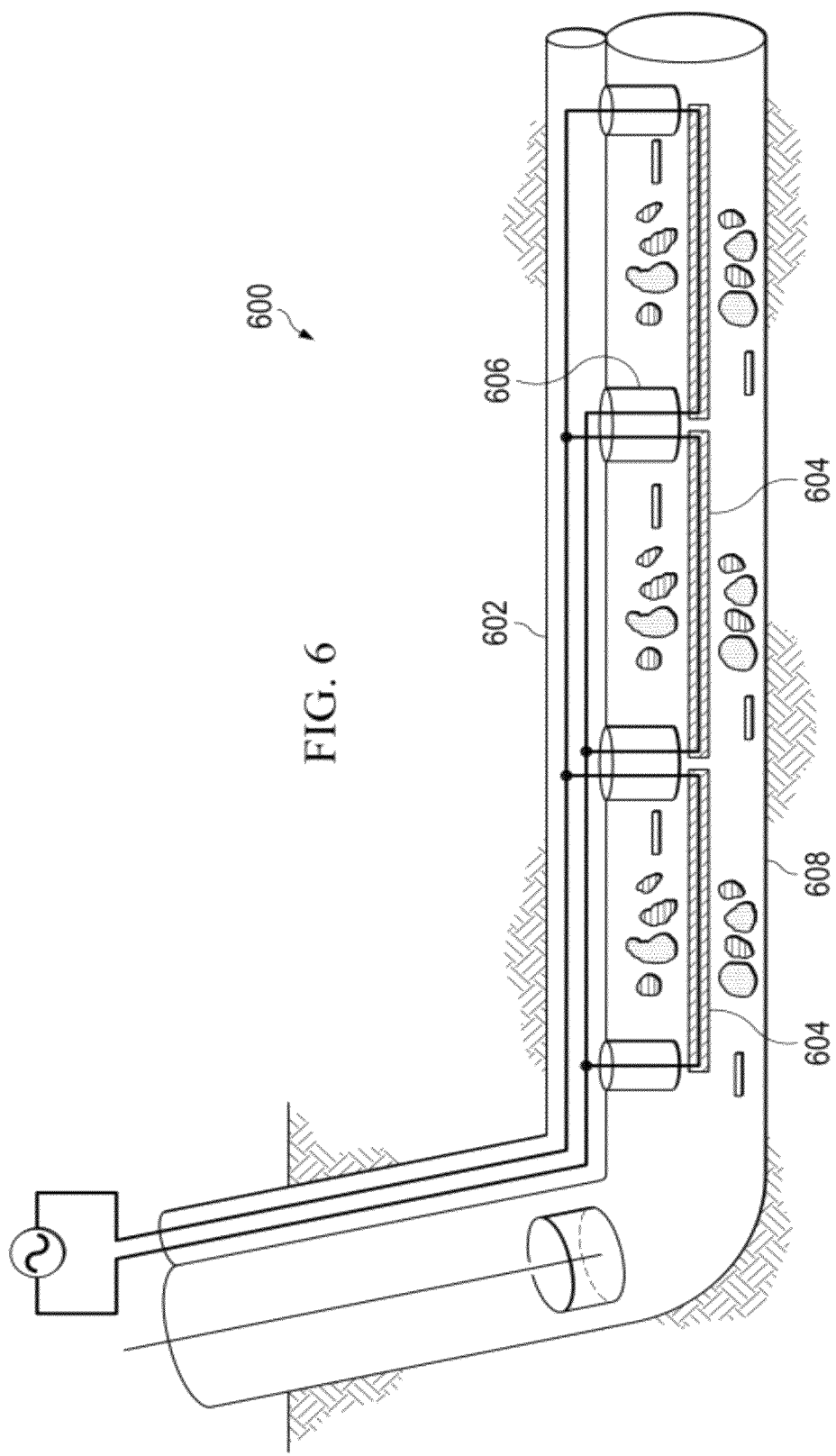
FIG. 6 is a detailed illustration of the materials used in the antenna design of the present invention.

FIG. 6 is a more detailed description of the materials being used for the operation of the RF heating array 600. For this design, it is assumed that the pipe 608 of the producer well is an electrically conductive material, e.g. iron. Two wires are inside the shielded outer tube 602, but operation with more wires is possible, for example using 3-phase power to control each antenna. The centerline consists of an electrically non-conductive coating 604 over an internal electrical conductor. Inside the producer well, the electrical feed-through bushing 606 has an electrically conductive outer tube enclosing the wires inside. The shielding or casing for the wires may be a metal tube, metal braided wire like a coax shield, conduit, or even metal coating on plastic.

Figure 7:
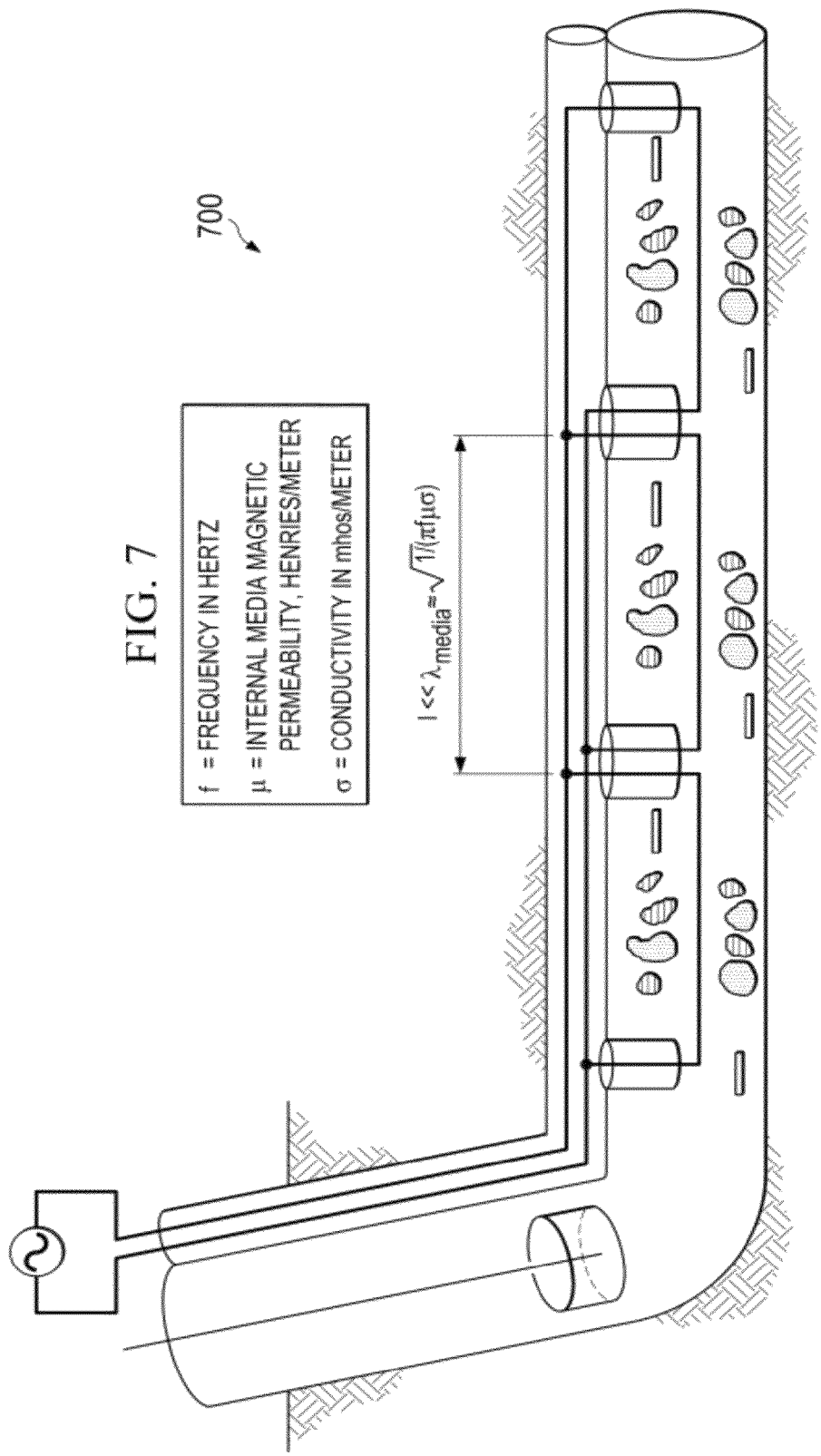
FIG. 7 is a schematic view showing the design of the interval between each antenna.

FIG. 7 depicts the design aspects of the array of linear heating antenna. As can be appreciated, the electrical feeding of the linear antenna is accomplished at regular intervals corresponding to the dissipation of the electrical currents the antenna conveys. The frequency of these intervals may correspond to the radio frequency skin depth of the media to be heated and dimensionalizing the antenna array according to these principles may comprise a method of the present inventive embodiment. The electrical feeding interval is calculated from the radio frequency skin depth by the equation:

$$\delta = \sqrt{\rho/\omega\mu}$$

where
  $\delta$ = the skin depth
  $\rho$ = the resistivity of the hydrocarbon formation or feedstock in ohm/meter
  $\omega$ = the angular frequency = $2\pi f$ radian/second,
  $\mu$ = the absolute magnetic permeability which is typically $4\pi \times 10^{-7}$ H/m in hydrocarbon ores.

Therefore, the interval I is roughly calculated by the following equation:

$$I \approx \sqrt{1/\pi f \mu \sigma}$$

where
  f is the frequency in hertz;
  $\mu$ is the internal media magnetic permeability in henries/meter, and
  $\sigma$ is the conductivity in siemens/meter.

Following this equation, in rich Athabasca oil sand, the interval I may be 9 meters. However, a skilled artisan can calculate other suitable intervals using the equation without deviating from the teaching of the present invention.

Figure 8:
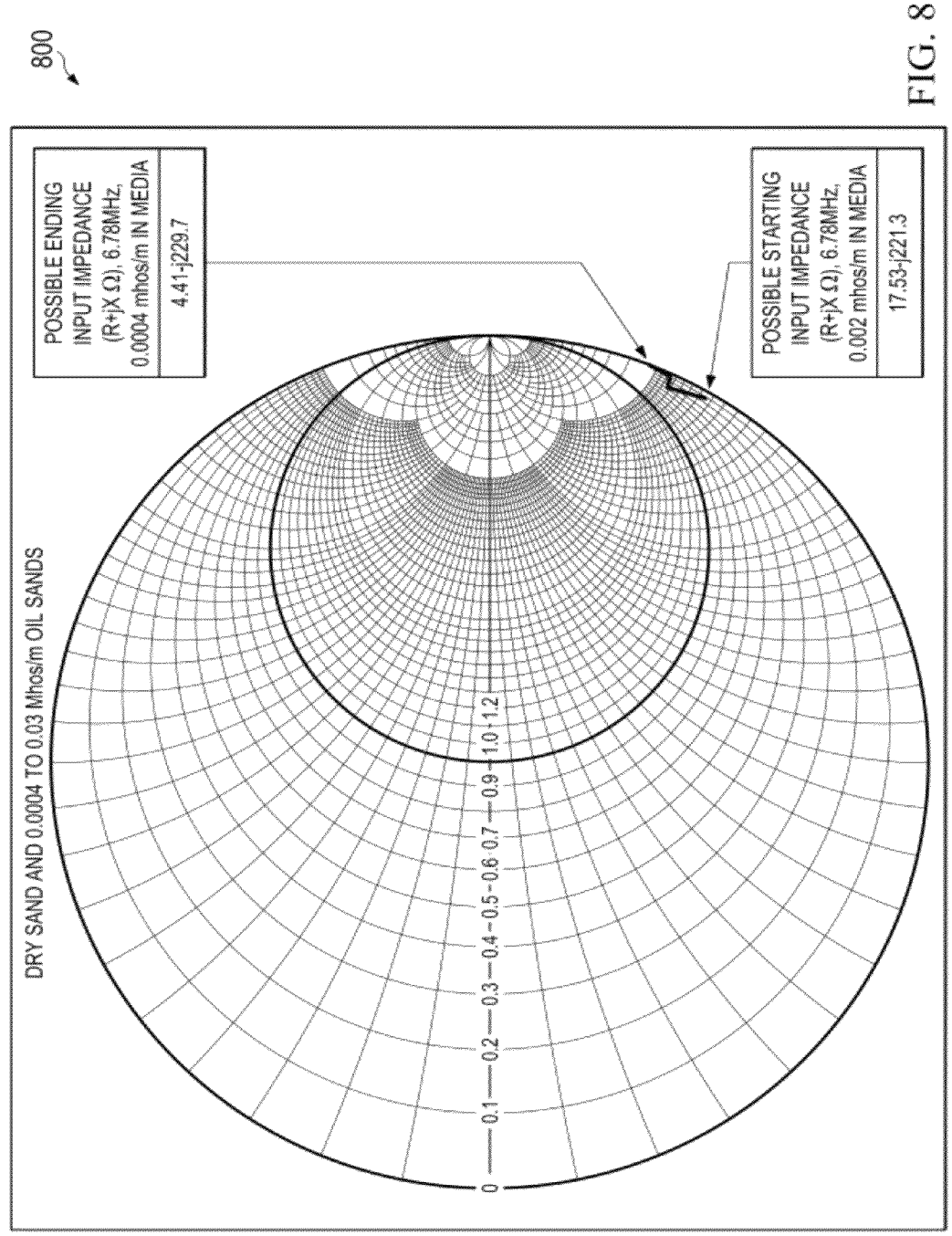
FIG. 8 is a representation of electrical load impedance simulation.

FIG. 8 depicts representative electrical load characteristics of a linear heating antenna according to the present embodiments. The diagram is that of a Smith Chart that plots the reflected energy in polar form. As can be seen, the electrical resistance and the electrical reactance of the antenna can vary with time, temperatures and the phase of the media to be heated. A method of the invention is to compensate for the dynamics with remotely located reactive networks on the surface, such as transformers and reactors like capacitors and inductors. In this example, oil sands dry out due to heating and as shown in the figure, the resistance rises by nearly a factor of 4, so the turns ratio of a surface transformer would vary by the square root of 4, or by 2, to 1 throughout the heating, as will be familiar from transformer design principles. Thus, the electrical load characteristics may be practically managed.

In order to effectively design both the antenna and the upgrading in situ producer well, laboratory experiments were performed to measure the dielectric real and imaginary components of the catalysts. The derivation analysis indeed showed that the dielectric permittivity is a dominant characteristic in affecting the heating process. These factors are important because the change in temperature derived by the RF radiation process is primarily driven by the dielectric permittivity. The measured data from the catalyst showed that this kind of media is excellent to affect or regenerate with heat induced by electromagnetic stimulus.

Although the proposed antenna design in FIG. 5 is easily capable of regenerating the catalysts to the required temperature of 600° C., it will be important for preliminary testing to be performed to determine the overall affects. There are multiple designs to determine heating affects, but the most easily controllable will be an above ground device identified as a resonant ring structure. This overall structure will prove the requirements of the heating source so that the catalyst can be optimized for upgrading in situ by either being injected as slurry or located as a catalyst bed along the entire length of the producer well.

Figure 9:
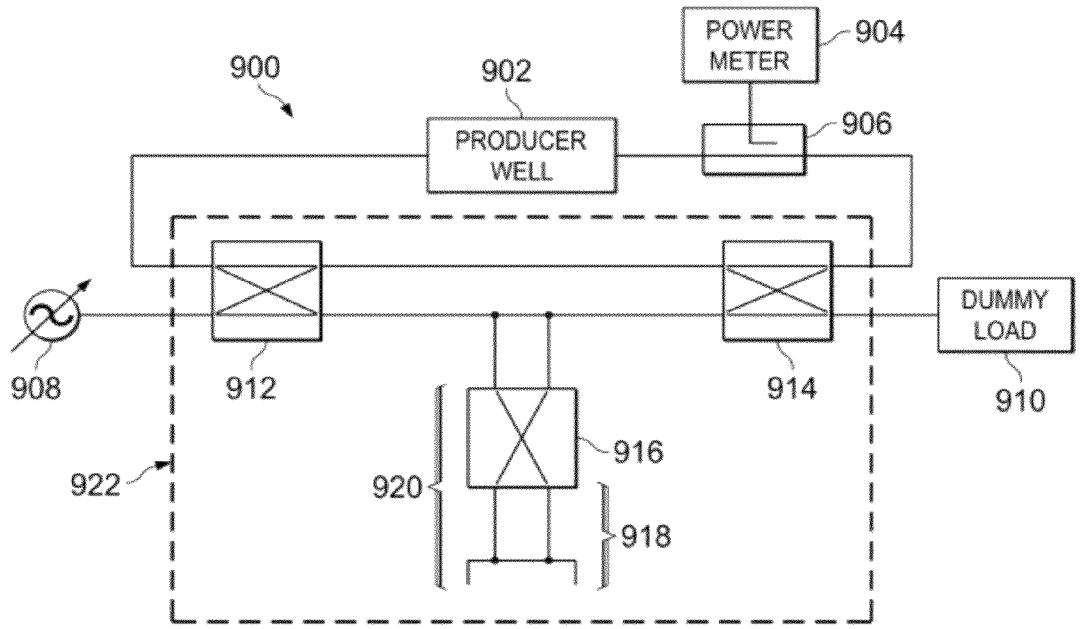
FIG. 9 is a representation of test bed design for catalyst regeneration testing that could be used in the present invention.
Figure 10:
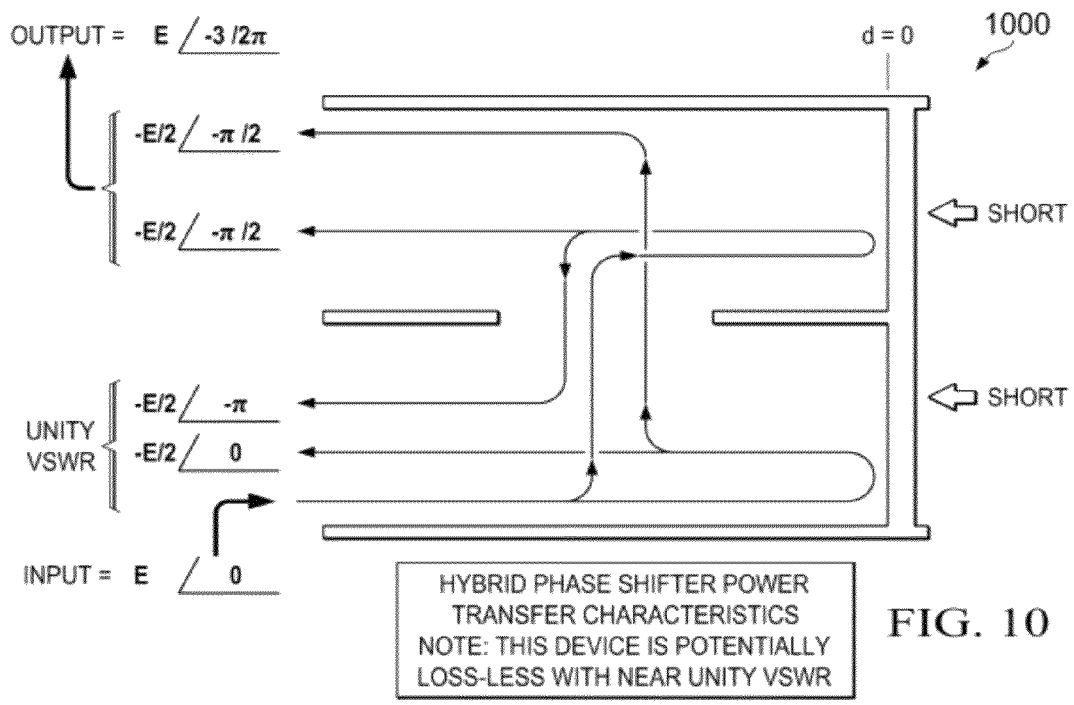
FIG. 10 shows the system variable coupler design that could be employed by the present invention.
Figure 11:
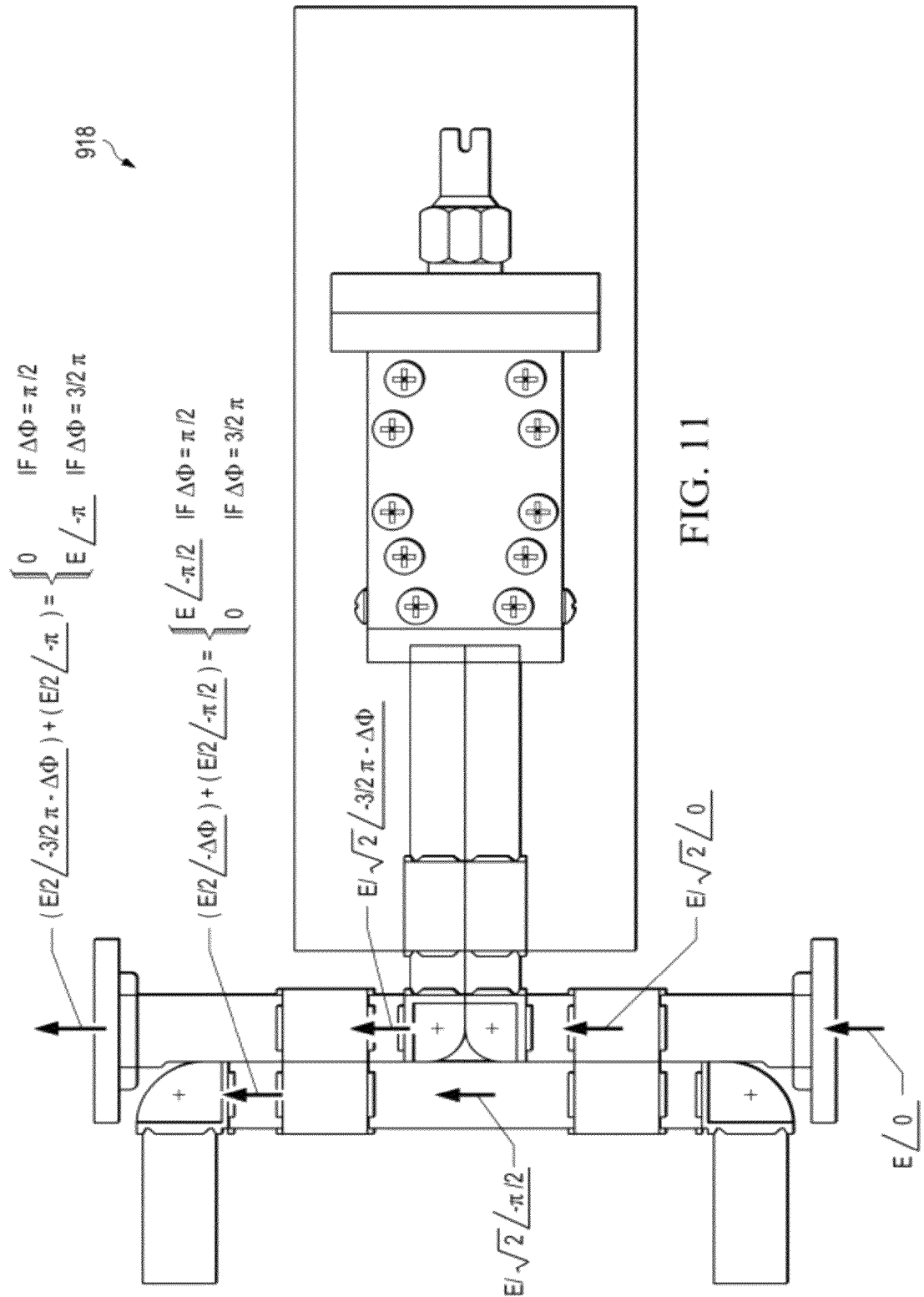
FIG. 11 shows the stub tuner that can be used in the present invention.

When initially implemented, this resonant ring structure can be placed above ground to determine the effects of regenerating the catalyst, using for example the set-up pictured in FIG. 9. The producer well 902 begins with a signal generator 908 coupled to a resonant ring structure, the detail of which is shown in FIG. 10. Variable coupler 922, which comprises three 90° hybrid couplers 912, 914 and 916, and a phase shift system 920 that comprises the hybrid coupler 916 and a manual-controlled stub tuner 918, is therefore coupled to the variable frequency transmitter 908 for adjusting the frequencies used in the setting. The manual-controlled stub tuner 918 (detail shown in FIG. 11) allows the controlling of the signal through the system. Stub Tuners allow precision matching within RF systems and subsystems to ensure optimum power transmission from source to load. The resonant ring can be synthesized using a waveguide analysis. The high power is achieved by synchronizing the signal with the resonant ring. The producer well is coupled to the resonant ring through dielectric ports. Any RF discharge will be measured and this will help finalize the embodiment of the antenna.

In summary, the current invention is intended to outline processes for upgrading hydrocarbon material within subsurface reservoirs prior to being produced to surface handling facilities. Catalysts may be used in this process to facilitate controlled upgrading at lower temperatures. However, in some instances it may be desired to thermally crack the hydrocarbons in the absence of catalyst in efforts to produce a more economically profitable process. The various reaction pathways which may be exploited are hydrotreating reactions at 315-430° C., hydrocracking reaction at 370-425° C., and thermal cracking reaction at 430-540° C. For all reaction pathways, it may be beneficial to inject up to a 10% (v/v) stream of $CO_2$ into the reaction zone to minimize coke formation and maximize the life expectancy of the catalyst. The flow of bitumen or heavy oil will be facilitated by utilizing the steam assisted gravity drainage process and the additional heat required for upgrading the hydrocarbon will be introduced into the system by incorporating radio frequency heating.

An advantage of the present invention is that it allows for oils to contact catalyst and hydrogen at required temperatures prior to being produced. As the oil is upgraded, the viscosity will be further reduced, which will lead to an increase in the overall recovery of the oil and limit or eliminate surface processing and reduce transportation costs.

The present invention can be used in combination with, or before or behind, any other enhanced oil recovery method that also facilitates the in situ upgrading of heavy oil and/or bitumen, including steam drive, cyclic steam stimulation, VAPEX, gas injection, chemical injection, microbial injection, solar thermal enhanced oil recovery, in situ combustion, and combinations thereof.

What is claimed is:

1. A method of enhancing in situ upgrading hydrocarbons in a producer well in a hydrocarbon reservoir, comprising:
  a) providing a producer well pipe having a catalyst in contact with the hydrocarbons to be produced;
  b) providing a radio frequency (RF) heating mechanism, wherein said RF heating mechanism comprises a plurality of RF antennas inside the producer well, and a RF current source connected to the RF antennas by conductive wires at or near the producer well;
  c) heating said hydrocarbons to a temperature sufficient to make upgraded hydrocarbons, and
  d) producing the upgraded hydrocarbons.

2. The method of claim 1, wherein the catalyst comprises hydroprocessing catalysts.

3. The method of claim 2, wherein the hydroprocessing catalysts comprise metal sulfides, metal carbides, refractory type metal compounds, or the combination thereof.

4. The method of claim 3, wherein the metal sulfides catalysts are $MoS_2$, $WS_2$, CoMoS, NiMoS or the combination thereof; the metal carbides are MoC, WC or the combination thereof; and the refractory type metal compounds are metal phosphides, metal borides or the combination thereof.

5. The method of claim 1, wherein the plurality of RF antennas are linear RF antennas.

6. The method of claim 5, wherein the linear RF antennas are along the centerline of the producer well.

7. The method of claim 5, wherein the linear RF antennas are spaced apart with a regular interval, wherein the interval corresponds to the dissipation of the electrical currents the antennas convey.

8. The method of claim 7, wherein the interval is determined by the formula $I \approx \sqrt{1/\pi f \mu \sigma}$, where f=frequency in hertz, $\mu$=internal media magnetic permeability in henries/meter, and $\sigma$=conductivity in siemens/meter.

9. The method of claim 1, wherein the RF antennas are covered by electrically nonconductive coating over an internal electrical conductor, and the conductive wires are encased in a conductive tube.

10. The method of claim 1, wherein the RF current source further includes provisions for constant impedance matching.

11. The method of claim 1, further comprising introducing magnetic field susceptor particles to said hydrocarbons.

12. The method of claim 1, wherein the catalyst consists of an injected slurry or emulsion.

13. The method of claim 1, wherein the catalyst lines or packs said production well.

14. The method of claim 1, wherein step c) is performed in the presence of hydrogen to assist the upgrading processing.

15. A system for enhancing the in situ upgrading of a hydrocarbon in a producer well in a hydrocarbon reservoir, comprising:
  a producer well pipe located within the hydrocarbon reservoir, the producer well pipe having a centerline and a catalyst in contact with hydrocarbon to be produced;
  a plurality of radio frequency (RF) antennas located along the centerline of the producer well pipe; and
  a radio frequency current source connected to the plurality of RF antennas through conductive wires;
  wherein each of the plurality of antennas are spaced apart from each other.

16. The system of claim 15, further comprising a means for delivering hydrogen to the hydrocarbon reservoir.

17. The system of claim 15, wherein the catalyst comprises hydroprocessing catalysts selected from the groups consisting of metal sulfides, metal carbides, refractory type metal compounds or the combination thereof; wherein the metal sulfides are selected from the group consisting of $MoS_2$, $WS_2$, CoMoS, NiMoS or the combination thereof; the metal carbides are selected from the group consisting of MoC, WC or the combination thereof; and the refractory type metal compounds are selected from the group consisting of metal phosphides, metal borides or the combination thereof.

18. The system of claim 15, wherein the RF antennas are linear RF antennas.

19. The system of claim 18, wherein the linear RF antennas are spaced apart with a regular interval I determined by the formula: $I \approx \sqrt{1/\pi f \mu \sigma}$, where f=frequency in hertz, $\mu$=internal media magnetic permeability in henries/meter, and $\sigma$=conductivity in siemens/meter.

20. The system of claim 18, wherein the linear RF antennas are embedded in the producer well pipe.

21. The system of claim 15, wherein the producer well pipe further includes a radio frequency heating susceptor.

22. The system of claim 21, wherein the radio frequency heating susceptor is a magnetic field heating susceptor.

23. The system of claim 21, wherein the radio frequency heating susceptor is pentacarbonyl iron powder with phosphate ($FeSO_4$) coating.

24. The system of claim 21, wherein the radio frequency heating susceptor is a graphitic material.

25. The system of claim 15, wherein the conductive wires are encased in a conductive tube.

* * * * *